US007234298B2

(12) United States Patent
Brinkman et al.

(10) Patent No.: US 7,234,298 B2
(45) Date of Patent: Jun. 26, 2007

(54) HYBRID HYDRAULIC SYSTEM AND WORK MACHINE USING SAME

(75) Inventors: Jason Lee Brinkman, Peoria, IL (US); Pinaki Gupta, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/245,376

(22) Filed: Oct. 6, 2005

(65) Prior Publication Data

US 2007/0079609 A1 Apr. 12, 2007

(51) Int. Cl.
*F16D 31/02* (2006.01)

(52) U.S. Cl. ............................ 60/414; 60/475; 60/476

(58) Field of Classification Search .................. 60/413, 60/414, 475, 476
See application file for complete search history.

(56) References Cited

U.S. PATENT DOCUMENTS 4,819,429 A 4/1989 Kordak
5,819,536 A 10/1998 Mentink
6,467,264 B1 10/2002 Stephenson et al.
6,502,393 B1 1/2003 Stephenson et al.
6,584,769 B1 7/2003 Bruun
6,748,738 B2 6/2004 Smith
6,789,387 B2 9/2004 Brinkman
6,804,957 B2 10/2004 Bruun
2003/0097837 A1* 5/2003 Hiraki et al. ................. 60/486

OTHER PUBLICATIONS

Rahmfeld and Ivantysynova, Displacement Controlled Linear Actuator With Differential Cylinder—A Way To Save Primary Energy In Mobile Machines; Technical University of Hamburg-Harburg, Aircraft Systems Engineering, Nesspriel 5, D-21129; pp. 1-6; Hamburg, Germany.

* cited by examiner

*Primary Examiner*—Michael Leslie
(74) *Attorney, Agent, or Firm*—Liell & McNeil

(57) ABSTRACT

A hydraulic system and work machine are provided, the hydraulic system including at least one hydraulic cylinder with a first port and a second port connected by a first fluid passage. A first pump, which is a bi-directional hydraulic pump is positioned within the first fluid passage, and a second pump is positioned in parallel with the first pump and disposed within a second fluid passage. An accumulator fluidly connects with the second fluid passage.

20 Claims, 2 Drawing Sheets

HYBRID HYDRAULIC SYSTEM AND WORK MACHINE USING SAME

TECHNICAL FIELD

The present disclosure relates generally to hydraulic systems for work machines, and relates more particularly to a hybrid hydraulic system having first and second hydraulic pumps positioned in parallel in a hydraulic circuit, and an accumulator for storing and recovering hydraulic energy of the hydraulic system.

BACKGROUND

Hydraulic systems in a wide variety of forms are indispensable components of many modern work machines. Virtually all tractors, loaders, excavators and other off highway work machines utilize hydraulically actuated work implements. In a typical design, the work machine hydraulic system will include one or more hydraulic pumps coupled with an engine of the work machine and operable to supply a pressurized hydraulic fluid to hydraulic actuators for adjusting the position of a work implement, such as a bucket or blade. In other applications, hydraulic actuators may be used in work machine stabilizers, and even in steering systems of work machines.

Actuation of hydraulic cylinders in the hydraulic system consumes energy provided by the work machine engine, or another power source such as a fuel cell or battery. For example, a boom arm of an excavator or loader will be lifted to a raised position by providing hydraulic fluid to one or more hydraulic actuators coupled therewith. The energy required to raise the boom arm against the force of gravity, for example, may be provided by pressurized hydraulic fluid from the work machine's hydraulic pump. When lowering the boom arm, in contrast, the force of gravity acting on the boom arm will cause it to lower, urging hydraulic fluid out of one side of the hydraulic actuator. In traditional designs, the hydraulic fluid flowing from the actuator is typically transitioned to a low pressure drain. Where the boom arm is in a raised position, the system may be thought of as comprising potential energy, initially inputted to the system in the form of hydraulic energy to raise the boom arm. Where hydraulic pressure is bled to a low pressure drain as the boom arm is lowered, the potential energy residing in the raised boom arm can be lost.

In more modern designs, it is recognized that pressurized fluid derived from a gravity-assisted extension or retraction of a hydraulic actuator may be stored and later returned to the system as needed. In certain designs, an accumulator is connected with the hydraulic system, and can store pressurized hydraulic fluid, then selectively return the fluid to the system on demand. Over the years, engineers have developed a wide variety of designs for recovering hydraulic energy in work machine hydraulic systems. "Hybrid" hydraulic systems, as such designs are referred to in the art, have shown much promise for energy conservation and fuel economy purposes. In certain hybrid designs, fluid may be transitioned directly between the head and rod side of the actuator, rather than sending all of the fluid evacuated from one side of the actuator to drain.

Even the most advanced hybrid hydraulic systems, however, are not without drawbacks. In particular, a phenomenon known in the art as "voiding" may occur in both hybrid and non-hybrid hydraulic systems. Voiding describes the tendency for one of the rod chamber and head chamber of a hydraulic cylinder to develop a void or space, not filled with hydraulic fluid as the actuator is extended or retracted. Voiding is the result at least in part of the difference in fluid volumes between a rod side and a head side of the actuator. In particular, because the rod occupies a certain fluid volume, when fluid is transitioned from the rod side to the head side or a drain, a void may form in the rod side of the actuator. During operation, the generation of such a void may result in a delay in the motion of the hydraulic actuator until the system pumps and/or accumulator can provide the required fluid volume. In certain systems, voiding in the hydraulic pump itself may result from unequal fluid volumes in the head and rod, for example, when extending a hydraulic actuator.

One hydraulic system directed to storing hydraulic energy in a hydraulic system has been described in the technical publication entitled, "Displacement Controlled Linear Actuator With Differential Cylinder—A Way To Save Primary Energy In Mobile Machines", by Robert Rahmfeld and Monika Ivantysynova of the technical University of Hamberg, Germany. Rahmfeld and Ivantysynova describe a system having a variable displacement, bi-directional hydraulic pump that transitions hydraulic fluid between a head chamber and a rod chamber of a hydraulic cylinder. An accumulator and additional pump are fluidly connected with the hydraulic circuit. While the Rahmfeld and Ivantysynova design offers certain advantages, it also presents certain disadvantages, in particular the fact that much of the hydraulic energy from an overrunning load cannot be stored in the relatively low pressure accumulator.

The present disclosure is directed to overcoming one or more of the problems or shortcomings set forth above.

SUMMARY OF THE DISCLOSURE

In one aspect, the present disclosure provides a hydraulic system including at least one hydraulic cylinder having a first port and a second port. A first fluid passage connects the first and second ports, and a first pump that is a bi-directional hydraulic pump is disposed within the first fluid passage. A second fluid passage connects with the first fluid passage, and a second pump is positioned within the second fluid passage and in parallel with the first pump. An accumulator is provided and fluidly connected with the second fluid passage.

In another aspect, the present disclosure provides a work machine that includes a hybrid hydraulic system having at least one hydraulic cylinder with a first port and a second port. A fluid passage connects the first and second ports, and a first pump which is a bi-directional pump is disposed within the fluid passage. A second pump is positioned in parallel with the first pump, the second pump being coupled with an accumulator and selectively connectable to the fluid passage at a position between the first port and the first pump, and at another position between the second port and the first pump.

In still another aspect, the present disclosure provides a method of operating a hydraulic system for a work machine. The method includes the step of, transitioning hydraulic fluid between first and second ports of a hydraulic cylinder at least in part via a first hydraulic pump which is a bi-directional pump. The method further includes the step of, transitioning hydraulic fluid between an accumulator and one of the first and second ports at least in part via a second pump positioned in parallel with the first pump.

DETAILED DESCRIPTION

Figure 1:
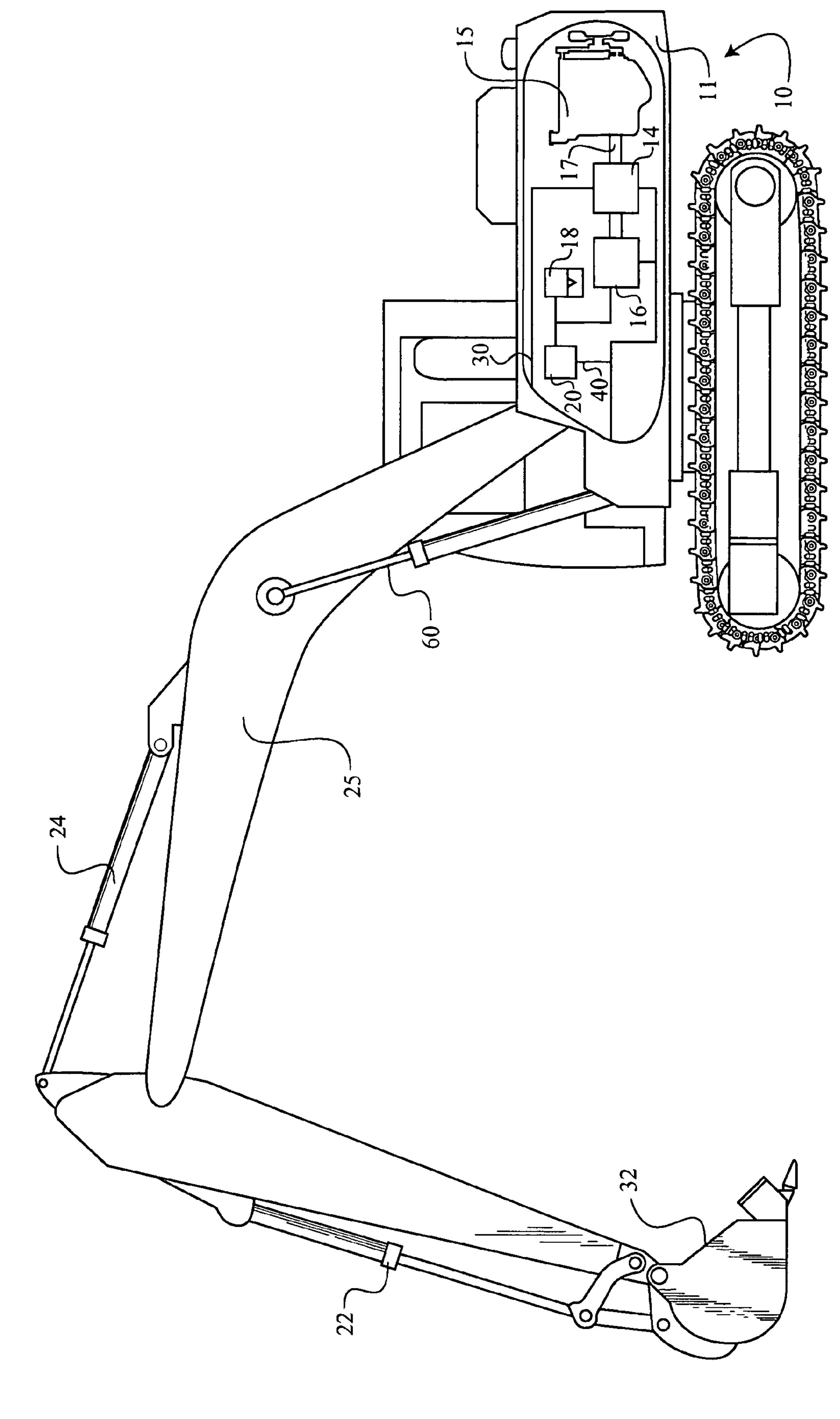
FIG. 1 is a side diagrammatic view of a work machine according to the present disclosure.

Referring to FIG. 1, there is shown a work machine 10 having a work machine body 11, a work implement arm 25 or boom arm and a hydraulic system 12. Hydraulic system 12 consists of a "hybrid" hydraulic system wherein hydraulic energy may be selectively stored and recovered, as described herein. Work machine 10 is illustrated in the context of a track-type excavator having a hydraulically actuated work implement such as a bucket 32. It should be appreciated, however, that work machine 10 is illustrative only, and the present disclosure will be applicable to virtually any hydraulic system having at least one hydraulic actuator, which may be a hydraulic cylinder.

Work machine 10 may further include an engine 15, which may be a conventional internal combustion engine, coupled with an output shaft 17. Rotation of output shaft 17 may power a first hydraulic pump 14, and a second hydraulic pump 16. It is contemplated that both pumps 14 and 16 will be overcenter bi-directional hydraulic pumps. With proper valves to re-route the flow, those skilled in the art will appreciate that each of these pumps 14 and 16 could remain on one side of center. Each of pumps 14 and 16 may also comprise a combination hydraulic pump/motor, and each may have a variable displacement. Thus, each respective pump/motor 14 and 16 may be driven by hydraulic fluid in system 12 to provide a torque to shaft 17, or may be driven by shaft 17 to pump fluid. For clarity, each of pump/motor 14 and 16 is referred to herein simply as a "pump." One or more hydraulic actuators, including hydraulic cylinders 22, 24, and 60 may also be components of hydraulic system 12. Hydraulic system 12 may further include an accumulator 18, for storing hydraulic energy of hydraulic system 12, and a valve assembly 20 for varying certain aspects of the operation of hydraulic system 12, as described herein.

Figure 2:
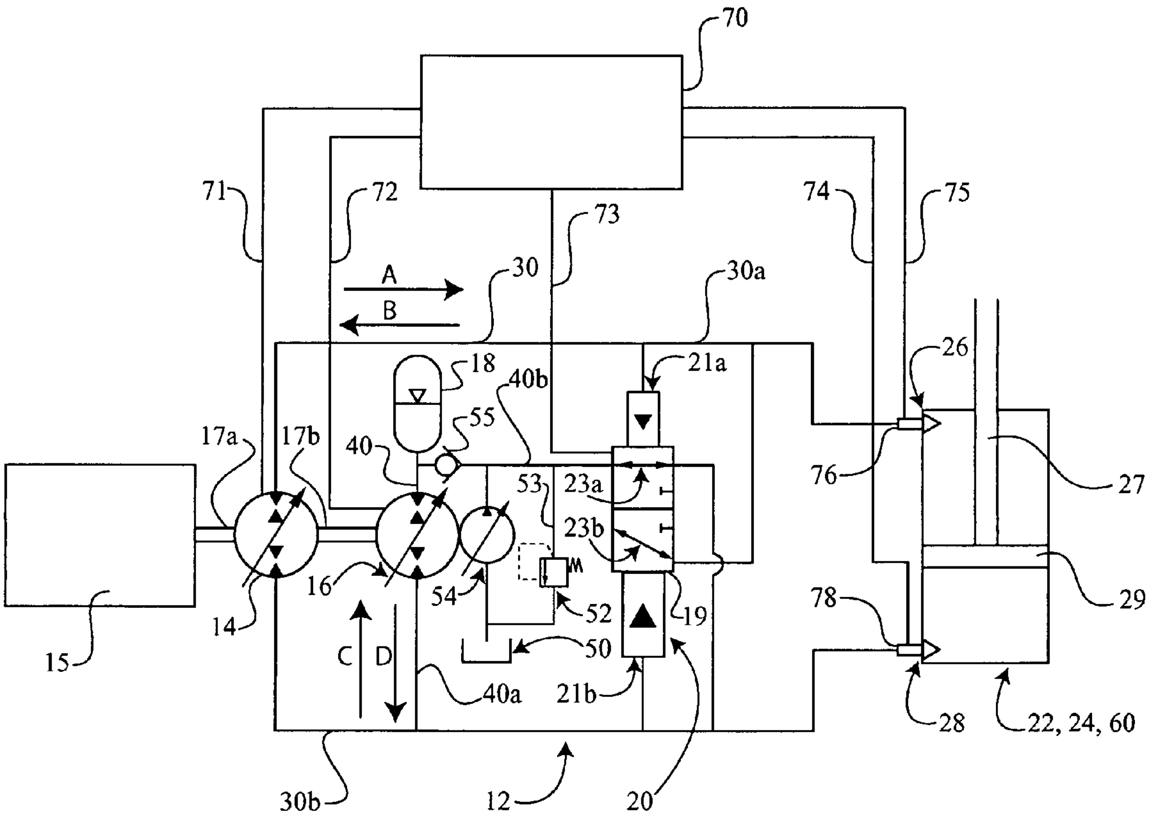
FIG. 2 is a diagrammatic view of a hydraulic system according to the present disclosure.

Referring also to FIG. 2, there is shown a portion of work machine 10 of FIG. 1, illustrating hydraulic system 12 coupled with engine 15. Hydraulic system 12 will include at least one hydraulic actuator, such as actuator 22, 24 or 60 shown in FIG. 1. The respective hydraulic actuator will include a head 29 connected with a rod 27 in a conventional manner, and will also include a rod port 26 and a head port 28 for transitioning fluid into and out of the hydraulic chambers defined by rod 27 and head 29. A first fluid passage 30 fluidly connects rod port 26 and head port 28, and is divided into a first portion 30*a* and a second portion 30*b* by first pump 14. First pump 14 will thus be disposed within first fluid passage 30, and operable to transition fluid between rod port 26 and head port 28 in either of a first flow direction "A" and a second flow direction "B". As described herein, first pump 14 may also operate as a motor, driven by pressurized fluid flowing between ports 26 and 28 and providing a torque to shaft 17.

Second pump 16 is disposed within a second fluid passage 40, having a first end 40*a* and a second end 40*b*. First end 40*a* may be fluidly connected with the second portion 30*b* of first fluid passage 30 between head port 28 and first pump 14. Second end 40*b* may be selectively connectable to first passage 30 at a point between rod port 26 and first pump 14 (first portion 30*a*), or at a point between head port 28 and first pump 14 (second portion 30*b*), its respective fluid connection being controlled by valve assembly 20, as described herein. Second pump 16 may be operable to transition fluid in either of a first direction "C" or a second direction "D" in second fluid passage 40. As described herein, second pump 16 may also operate as a motor, being driven by hydraulic fluid flowing through second passage 40. Accumulator 18 may be fluidly connected with second passage 40 between second pump 16 and valve assembly 20.

Certain aspects of hydraulic system 12 will typically be electronically controlled. To this end, hydraulic system 12 may include an electronic controller 70, coupled via a first communication line 71 with first pump 14 and via a second communication line 72 with second pump 16. Electronic controller 70 may further be coupled with valve assembly 20 via another communication line 73. Electronic controller 70 will typically be operable to vary such factors as pump speed, displacement and direction. Electronic controller 70 may further be operable to control the operation of pumps 14 and 16 such that they are substantially synchronous, and/or at equal or varied displacements relative to one another. Hydraulic system 12 may further include a rod valve 76 that is coupled with electronic controller 70 via yet another communication line 75, and a head valve 78 that is coupled with electronic controller 70 via yet another communication line 74. Those skilled in the art will appreciate that rod valve 76 and head valve 78 may be selectively opened or closed to block or enable fluid flow out of the respective rod and head ports 26 and 28. As described herein, a multiplicity of operating schemes are possible with hydraulic system 12, in part enabled by the selective control over various connections and fluid flow paths and rates as controlled by electronic controller 70.

First pump 14 is shown coupled with engine 15 via a first shaft 17*a*, whereas second pump 16 is shown coupled with first pump 14 and first shaft 17*a* via a second shaft 17*b*. It should be appreciated that a single, common shaft could connect engine 15 with pumps 14 and 16, or multiple shafts could connect each pump with engine 15. Further still, it should be appreciated that one or both of pumps 14 and 16 might be an electrically driven pump, not mechanically coupled with engine 15 at all. The various ways in which each of pumps 14 and 16 may be coupled with engine 15 and with one another provide substantial flexibility in the manner in which the respective pumps may be driven by engine 15, or some other power source, and also substantial flexibility in the manner in which one or both of pumps 14 and 16 may be used to apply a torque to engine 15 or to one another, as described herein. For example, one of pumps 14 and 16 could be used to drive the other pump. One or both of pumps 14 and 16 could be driven by engine 15 in a first mode, and independently or together provide a torque to engine 15 in a second mode.

As mentioned above, valve assembly 20 will be operable to selectively connect second end 40*b* of second passage 40 with either first portion 30*a* or second portion 30*b* of first passage 30. Valve assembly 20 may include at least one moveable valve member 19, which may be a spool valve member 19, having two configurations or states which each correspond to a different fluid connection for second passage 40. Spool valve member 19 may be a hydro-mechanically actuated spool valve member, including a first pressure surface 21*a* exposed to a fluid pressure of first portion 30*a* of first fluid passage 30, and also a second pressure surface 21*b* exposed to a fluid pressure of second portion 30*b* of first fluid passage 30. By exposing each of pressure surfaces 21*a* and 21*b* to the different portions of first fluid passage 30, valve member 19 may be hydro-mechanically adjusted to one of its configurations, based on the relative pressures of first portion 30*a* and second portion 30*b* of first passage 30.

Valve member 19 may include a first flow path 23*a*, for instance a passage or annulus, for connecting second end 40*b* of second fluid passage 40 with first portion 30*a* of first passage 30. Valve member 19 may further include a second flow path 23*b*, passage or annulus, for connecting second end 40*b* of second fluid passage 40 with second portion 30*b* of first fluid passage 30. Hydraulic pressure acting on pressure surfaces 21*a* and 21*b* may control the position of spool valve member 19. In one contemplated embodiment, where fluid pressure in first portion 30*a* of fluid passage 30 is relatively lower than that in second portion 30*b*, spool valve 19 may be hydraulically urged toward a position where second flow path 23*b* fluidly connects second end 40*b* of second passage 40 with first portion 30*a* of first passage 30. Where fluid pressure in first portion 30*a* if relatively higher than that in second portion 30*b*, the opposite may occur; first flow path 23*a* may connect second end 40*b* with second portion 30*b*. In one contemplated embodiment, pressure surfaces 21*a* and 21*b* will have different surface areas. For instance, first pressure surface 21*a* may be relatively smaller than second pressure surface 21*b*. In most embodiments, valve assembly 20 will be operable to selectively connect second end 40*b* of second fluid passage 40 with a lower pressure one of first and second portions 30*a* and 30*b*.

Although valve assembly 20 is shown in the context of a hydro-mechanically actuated spool valve member, those skilled in the art will appreciate that a multiplicity of designs exists whereby second fluid passage 40 might be selectively connected with first fluid passage portions 30*a* and 30*b* as described herein. For example, rather than the spool valve described herein, separate valves disposed in branching fluid passages might be employed without departing from the scope of the present disclosure. Similarly, rather than a hydro-mechanically actuated valve, any of several electrically actuated valve designs might be used, for example, a solenoid actuated valve, a piezo-electrically actuated valve member, etc.

Hydraulic system 12 may further include a charge or make up which also may be a variable displacement pump, pump 54, coupled with second end 40*b* of second fluid passage 40, to supply hydraulic fluid from a low pressure space or sump 50 to hydraulic system 12. A relief passage 53 also connects with second fluid passage 40 proximate second end 40*b*, and includes a relief valve 52 disposed therein that can allow excess hydraulic pressure in hydraulic system 12 to be bled to sump 50 as necessary. A check valve 55 may further be positioned between second pump 16 and valve assembly 20 in order to maintain flow to the inlet of pump 16 if the accumulator is empty and pump 16 is pumping oil in the direction D.

INDUSTRIAL APPLICABILITY

Hydraulic system 12 may be used in a variety of manners to extend and retract its actuator(s) 22, 24 and 60. In the illustrated context of work machine 10, hydraulic system 12 may transition hydraulic fluid between a rod end and head end of actuator 24, for example, to raise or lower the outer portion of boom arm 25. Hydraulic system 12 may be used to transition fluid between a rod end and a head end of actuator 24 to tilt the bucket implement 32 coupled therewith. Similarly, hydraulic fluid may be transitioned between a rod end and head end of actuator 60 to raise or lower boom arm 25. Each of actuators 22, 24 and 60 may be substantially identical, including a rod port 26 and head port 28 as shown in FIG. 2. Those skilled in the art will appreciate that the connection of ports 26 and 28 with the rest of hydraulic system 12 may be effectuated with pilot operated, or electronically controlled valves 76 and 78, in a manner transparent to an operator.

Where it is desirable to extend actuator 22, 24, 60, for example, pump 14 may be rotated, transitioning fluid in first passage 30. Extension of actuator 22, 24, 60 against resistance, such as the force of gravity is generally termed an "extend resistive" operation in the art. Extension of actuator 22, 24, 60 where assisted by the force of gravity, for example, is known in the art as an "extend overrun" operation.

In general terms, an extend resistive operation may take advantage of hydraulic energy stored in accumulator 18 to provide at least a portion of hydraulic fluid to the head end of actuator 22, 24, 60 to provide a force on head 29 and induce extension of actuator 22, 24, 60. A typical extend resistive action might include extending cylinder 22 to draw bucket 32 toward work machine body 11 during a digging operation, against a resistive force provided by a work material such as soil or rock. Thus, in extend resistive mode, pump 14 may be rotated by engine 15 to pump fluid between rod port 26 and head port 28. Simultaneously, fluid will be supplied by accumulator 18 to the second portion 30*b* of first passage 30 via first end 40*a* of second passage 40. Valve assembly 20 will typically be in such a configuration that second passage 40 connects with first portion 30*a*, providing a fluid connection via second flow path 23*b*. Second pump 16 will typically be rotated in the same direction as first pump 14, transitioning fluid from accumulator 18 as well as from first portion 30*a* to second portion 30*b*, and ultimately to head port 28. Rotation of second pump 16 may result from a torque applied thereto via shaft 17*b*, such that second pump 16 acts predominately as a pump. Hydraulic fluid from accumulator 18 may also be used to induce rotation of pump 16 such that it can apply a torque to either or both of pump 14 and engine 15. Charge pump 54 may be rotated, and its displacement adjusted, to provide any extra fluid needed, whereas relief valve 52 may operate to bleed any excess pressure to sump 50. Due to the relatively lower pressure of first portion 30*a* than second portion 30*b* of first passage 30, valve assembly 20 may be automatically hydro-mechanically adjusted to the desired position, or maintained thereat if previously positioned thereat.

Conversely, an extend overrun operation may take advantage of relatively high pressure at the rod side of actuator 22, 24, 60. For example, a typical extend overrun operation might include extending cylinder 24 to lower the outer arm from an extended position toward a lowered position similar to that shown in FIG. 1. In other words, extension of the cylinder will be assisted by the force of gravity. In an extend overrun mode, fluid pressure in first portion 30*a* of first passage 30 may be relatively higher than in second portion 30*b*. Accordingly, valve assembly 20 may be automatically urged to, or maintained at, a desired position such that first flow path 23*a* fluidly connects the second end 40*b* of second fluid passage 40 with second portion 30*b* of first passage 30. Accordingly, second fluid passage 40 provides a fluid circuit wherein both ends 40*a* and 40*b* of second fluid passage 40 connect with second portion 30*b* of first passage 30. First pump 14 may be rotated to transition fluid from rod port 26 to head port 28. The relatively high pressure supplied from rod port 26, however, may be used to rotate first pump 14 to apply a torque to engine 15. Second pump 16 may be rotated, either via pressurized fluid from accumulator 18, or via a torque provided by first pump 14. Where excess hydraulic pressure exists in second portion 30*b* of first passage 30, it may be used to charge accumulator 18. Charge pump 54 may be used to provide any necessary additional hydraulic fluid, whereas relief valve 52 may operate to bleed any excess pressure to sump 50.

Retraction of actuator 22, 24, 60 similarly includes "resistive" and "overrun" modes. Conceptually, these modes are generally similar to the extend resistive and overrun modes, at least with respect to the action of gravity assisting or opposing the retraction, as described herein. In a retract resistive mode, retraction of actuator 22, 24, 60 will be against a load. In other words, in retract resistive mode, an external force such as gravity opposes retraction of actuator 22, 24, 60. In retract resistive mode, relatively higher hydraulic pressure in first portion 30*a* than in second portion 30*b* of first passage 30 may adjust or maintain valve assembly 20 in a position such that first flow path 23*a* provides fluid communication between second end 40*b* of second passage 40 and second portion 30*b* of first passage 30. Thus, the fluid connections in the system in retract resistive mode may be identical to fluid connections in extend overrun mode. Pump 14 may be rotated by engine 15 to transition fluid from head port 28 to rod port 26. Pump 16 may or may not be rotated. Charge pump 54 may be used to provide any necessary additional hydraulic fluid, whereas relief valve 52 may operate to bleed any excess pressure to sump 50.

In a retract overrun mode, pressure will be relatively higher in second portion 30*b* of first passage 30 than in first portion 30*a*. Accordingly, valve assembly 20 will be urged to, or maintained at a position whereby second flow path 23*b* fluidly connects second end 40*b* of second passage 40 with first portion 30*a* of first passage 30. First pump 14 may be rotated, for example, via fluid transitioning between head port 28 and rod port 26, applying a torque to engine 15. Second pump 16 may also be rotated, transitioning fluid from second portion 30*b* of first passage 30 to accumulator 18.

Those skilled in the art will appreciate that many different, additional operating schemes may be developed for the system shown by way of example in FIGS. 1 and 2. For instance, it should be appreciated that excess hydraulic pressure in the system can be advantageously recovered in a variety of ways. Excess or even stored hydraulic energy could be preferentially used to apply a torque to engine 15 via one or both of pumps 14 and 16, reducing its fuel consumption directly. Similarly, excess or stored hydraulic energy could always be preferentially used to fully charge accumulator 18 before applying any torque to engine 18, if at all. Such an approach could reduce overall energy consumption of the system, as compared with other designs, but in an indirect fashion.

As described herein, each of pumps 14, 16 and 54 may have a variable displacement. By varying the displacement of one or both of pumps 14 and 16, additional operating strategies may be achieved. In general, the displacement of each of pumps 14 and 16 will be equal, and identical pumps may be used in certain embodiments. In one contemplated embodiment, first pump 14 may be responsible for transitioning the volume of rod 27 between ports 26 and 28, whereas second pump 16 may transition whatever additional fluid is necessary, in other words, a head volume minus a rod volume. By providing two separate pumps, in parallel, problems of voiding associated with certain earlier designs can be eliminated. In particular, rather than attempting to use a relatively large, expensive pump that can transition fluid rapidly enough to reduce voiding, the two smaller pumps can both minimize or eliminate voiding, and substantially reduce hardware costs. Moreover, as described herein, the use of two pumps disposed in parallel, creates tremendous flexibility in operation.

Yet another advantage of the dual pump design of the present disclosure relates to the required volume of the accumulator. Because hydraulic system 12 can provide two different fluid volumes to the head side and the rod side of actuator 22, 24, 60, the size of accumulator 18 need only be as large as one half of the volume of rod 27, i.e. the difference between the head side and the rod side volumes. Where actuator 22, 24, 60 is completely retracted, for example, substantially all of the hydraulic fluid of system 12 (excepting that remaining in the various passages and pumps) may reside in the rod end of actuator 22, 24, 60 and in accumulator 18. Where actuator 22, 24, 60 is completely extended, substantially all of the hydraulic fluid of system 12 may reside in the head side of actuator 22, 24, 60. Those skilled in the art will appreciate, however, that in many, if not most embodiments, a accumulator 18 may be larger than this minimum size. This would allow greater energy storage capacity, for example, where hydraulic system 12 includes more than one cylinder as will often be the case.

The present description is for illustrative purposes only, and should not be construed to narrow the breadth of the present disclosure in any fashion. Thus, those skilled in the art will appreciate that various modifications might be made to the presently disclosed embodiments without departing from the intended spirit and scope of the present disclosure. The above described valve configurations and pump rotation directions, etc. are thus contemplated to be practical implementation strategies for the described operating modes, but they are by no means limiting. For example, while it is contemplated that valve assembly 20 will provide fluid communication via its respective flow paths 23*a*, 23*b*, as described in the specific operating schemes above, the illustrated configurations are not necessary. Selective variation of the configuration/position of valve assembly 20 might be achieved via one or more electrical actuators, coupled with an electronic controller for example, to further vary the available flow patterns. Adjusting the pump displacements will introduce still further possibilities with respect to available flow patterns. Further still, while it is contemplated that second pump 16 will typically be a bi-directional pump, it need not be. In other contemplated embodiments, pump 16 might be uni-directional, and a valve incorporated into the design that reroutes flow around pump 16. Other aspects, features and advantages will be apparent upon an examination of the attached drawings and appended claims.

What is claimed is:

1. A hydraulic system comprising:

at least one hydraulic cylinder including a first port and a second port;

a first fluid passage connecting said first and second ports;

a first hydraulic pump, which is a bi-directional pump, disposed within said first fluid passage, said first fluid passage including a first portion between said first pump and said first port and a second portion between said first pump and said second port;

a second fluid passage connected with said first fluid passage;

a second hydraulic pump in parallel with said first pump and disposed within said second fluid passage;

an accumulator fluidly connected with said second fluid passage;

a fluid supply separate from said accumulator and configured to supply a fluid to each of the first and second portions of said first fluid passage; and a valve configured to selectively connect said fluid supply with one of the first and second portions of said first fluid passage based at least in part on a pressure difference between said first and second portions, said valve having a first position at which said fluid supply connects with the first portion but not the second portion of said first fluid passage, and a second position at which said fluid supply connects with the second portion but not the first portion of said first fluid passage.

2. The hydraulic system of claim 1 wherein said fluid supply is connected with said second fluid passage, and wherein said valve includes a valve member disposed at least partially within said second fluid passage, said valve member being hydraulically movable between said first and second positions in response to a pressure difference between the first and second portions of.

3. The hydraulic system of claim 2 wherein said valve member includes a first pressure surface and a second pressure surface, said first and second pressure surfaces being exposed to a fluid pressure of the first and second portions of said first fluid passage, respectively, and having different effective areas.

4. The hydraulic system of claim 2 wherein:

said first and second pumps each comprise an identical variable displacement combination hydraulic pump/hydraulic motor; and said accumulator includes a volume that can store about one half of a maximum displacement volume of said at least one hydraulic cylinder.

5. A hydraulic system comprising:

at least one hydraulic cylinder including a first port and a second port;

a first fluid passage connecting said first and second ports;

a first hydraulic pump, which is a bi-directional pump, disposed within said first fluid passage;

a second fluid passage connected with said first fluid passage;

a second hydraulic pump in parallel with said first pump and disposed within said second fluid passage;

an accumulator fluidly connected with said second fluid passage; and a valve assembly having a first configuration wherein one end of said second fluid passage is connected with said first fluid passage at a position between said first pump and said first port, and a second configuration wherein said end is connected with said first fluid passage at a position between said first pump and said second port;

wherein said valve assembly includes a spool valve member; and wherein said spool valve member comprises a first pressure surface exposed to a fluid pressure of said first passage between said first pump and said first port, and a second pressure surface exposed to a fluid pressure of said first passage between said first pump and said second port, and said first and second pressure surfaces having different effective areas.

6. A hydraulic system comprising:

at least one hydraulic cylinder including a first port and a second port;

a first fluid passage connecting said first and second ports;

a first hydraulic pump, which is a bi-directional pump, disposed within said first fluid passage;

a second fluid passage connected with said first fluid passage;

a second hydraulic pump in parallel with said first pump and disposed within said second fluid passage;

an accumulator fluidly connected with said second fluid passage; and a valve assembly having a first configuration wherein one end of said second fluid passage is connected with said first fluid passage at a position between said first pump and said first port, and a second configuration wherein said end is connected with said first fluid passage at a position between said first pump and said second port;

wherein said valve assembly comprises a first valve, said hydraulic system further comprising a second valve disposed within said second fluid passage between said accumulator and said first valve.

7. The hydraulic system of claim 6 wherein said second valve is a check valve, said hydraulic system further comprising, a low pressure fluid supply; and a make-up pump disposed between said low pressure fluid supply and said second fluid passage.

8. A work machine comprising:

a hybrid hydraulic system that includes at least one hydraulic cylinder having a first port and a second port, and a fluid passage connecting said first and second ports, said hybrid hydraulic system further comprising a first pump, which is a bi-directional pump, disposed within said fluid passage, and a second pump in parallel with said first pump, said second pump being coupled with an accumulator;

said hydraulic system further including a fluid supply separate from said accumulator which is selectively connectable to a first portion of said fluid passage at a position between said first port and said first pump and selectively connectable to a second portion of said fluid passage at another position between said second port and said first pump, and a valve configured to selectively connect said fluid supply to said fluid passage at one of said first and second positions based at least in part on a pressure difference between the first and second portions of said fluid passage.

9. The work machine of claim 8 wherein said fluid passage is a first fluid passage having said first and second portions separated by said first pump, said hydraulic system further comprising:

a second fluid passage connected with said fluid supply and having a first end fluidly connected with said first fluid passage, said second pump being disposed within said second fluid passage and said valve being operable to selectively connect a second end of said second fluid passage with one of said first and second portions of said first fluid passage to selectively connect said fluid supply therewith.

10. The work machine of claim 9 wherein said valve includes a hydromechanically operated spool valve member.

11. The work machine of claim 9 wherein at least one of said first pump and said second pump includes a combination pump and motor coupled with an engine of said work machine.

12. The work machine of claim 11 further comprising a make-up pump configured to supply fluid from said fluid supply to said first passage and selectively separately connectable with each of said first and second portions of said first fluid passage via a movable valve member of said valve, wherein said valve is a first valve and said hydraulic system further comprises a second valve disposed in said second fluid passage between said accumulator and said first valve and being configured to permit fluid flow from said fluid supply to said second pump.

13. The work machine of claim 12 wherein each of said first and second pumps includes a bi-directional, variable displacement combination pump and motor coupled with said engine.

14. A method of operating a hydraulic system for a work machine comprising the steps of:

transitioning hydraulic fluid between first and second ports of a hydraulic cylinder at least in part via a first hydraulic pump, which is a bi-directional pump;

transitioning hydraulic fluid between an accumulator and one of the first and second ports at least in part via a second hydraulic pump positioned in parallel with the first pump; and replenishing a fluid volume of the hydraulic system, including a step of selectively connecting a fluid supply for the hydraulic system which is separate from the accumulator with one of a first portion and a second portion of a fluid passage wherein the first hydraulic pump is disposed based at least in part on a pressure difference between the respective portions of the fluid passage.

15. The method of claim 14 wherein the step of selectively connecting a fluid supply further comprising the comprises a step of selectively positioning at least one movable valve member to fluidly connect a make-up pump connected with the fluid supply with one of the first portion and the second portion of the fluid passage but not the other of the first portion and the second portion.

16. The method of claim 15 further comprising the step of storing energy of the hydraulic system at least in part by transitioning hydraulic fluid to the accumulator at least in part via the second pump.

17. The method of claim 16 further comprising the step of operating the make-up pump, which is coupled with the fluid passage having the second pump disposed therein, to replenish a fluid volume of the hydraulic system.

18. The method of claim 15 further comprising the step of applying a torque to an engine of the work machine via at least one of the first and second pumps.

19. The method of claim 15 wherein the positioning step further comprises moving the at least one movable valve member to fluidly connect the make-up pump with a lower pressure one of the first and second portions of the fluid passage having the first pump disposed therein.

20. The method of claim 19 wherein the positioning step comprises hydromechanically moving the at least one movable valve member.

* * * * *